(12) United States Patent
Yang et al.

(10) Patent No.: US 10,544,335 B2
(45) Date of Patent: Jan. 28, 2020

(54) TACKIFIER AND A CONTINUOUS PROCESS FOR PRODUCING THE TACKIFIER

(71) Applicants: Dow Global Technologies LLC, Midland, MI (US); Rohm and Haas Company, Philadelphia, PA (US)

(72) Inventors: Miao Yang, Shanghai (CN); Weichao Gu, Shanghai (CN); Zhaohui Qu, Shanghai (CN); Yongfu Liang, Shanghai (CN)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 1 day.

(21) Appl. No.: 15/522,431

(22) PCT Filed: Oct. 31, 2014

(86) PCT No.: PCT/CN2014/090001
§ 371 (c)(1),
(2) Date: Apr. 27, 2017

(87) PCT Pub. No.: WO2016/065604
PCT Pub. Date: May 6, 2016

(65) Prior Publication Data
US 2017/0313913 A1    Nov. 2, 2017

(51) Int. Cl.
| C09J 11/08 | (2006.01) |
| C08L 93/04 | (2006.01) |
| C09J 133/02 | (2006.01) |
| C09J 193/04 | (2006.01) |
| C08K 5/09 | (2006.01) |
| C09J 157/06 | (2006.01) |

(52) U.S. Cl.
CPC ............ *C09J 11/08* (2013.01); *C08K 5/09* (2013.01); *C08L 93/04* (2013.01); *C09J 133/02* (2013.01); *C09J 157/06* (2013.01); *C09J 193/04* (2013.01); *C08L 2201/50* (2013.01)

(58) Field of Classification Search
CPC ............ C09J 11/08; C09J 157/06; C08L 93/04
USPC ............................................. 524/271
See application file for complete search history.

(56) References Cited

U.S. PATENT DOCUMENTS

| 3,936,407 A | 2/1976 | Parkinson |
| 6,512,024 B1 | 1/2003 | Lundgard et al. |
| 7,470,736 B2 | 12/2008 | Cooper |
| 2007/0004967 A1 | 1/2007 | Ueno et al. |
| 2007/0029270 A1 | 2/2007 | Hawkinson |
| 2011/0020081 A1 | 1/2011 | Webb et al. |
| 2011/0200817 A1* | 8/2011 | Duckworth ......... C09D 133/02 428/336 |
| 2013/0202885 A1* | 8/2013 | Dodge ................ C09J 133/08 428/355 AC |
| 2014/0005124 A1 | 1/2014 | Garst et al. |

FOREIGN PATENT DOCUMENTS

| CN | 103709973 A | 4/2014 |
| WO | 1994/012272 A1 | 6/1994 |
| WO | 2001/038446 A1 | 5/2001 |

OTHER PUBLICATIONS

PCT/CN2014/090001, International Search Report and Written Opinion dated Jul. 28, 2015.
PCT/CN2014/090001, International Preliminary Report on Patentability dated May 11, 2017.

* cited by examiner

*Primary Examiner* — Deve V Hall

(57) ABSTRACT

A rosin dispersion is a reaction product of, by dry weight based on total dry weight of the rosin dispersion, from 80% to 98% a rosin resin, and from 2% to 20% a dispersant. The rosin resin is processed by at least one method of a) modification, b) hydrogenation or disproportionation, and c) polymerization or esterification from raw material rosins. The dispersant is selected from $C_{18}$-$C_{32}$ aliphatic carboxylic acids, olefin (meth) acrylic acid copolymers, and other acid/anhydride modified polymers. A continuous process for preparing the rosin dispersion and an adhesive formulation comprising the rosin dispersion are also included.

11 Claims, No Drawings

TACKIFIER AND A CONTINUOUS PROCESS FOR PRODUCING THE TACKIFIER

FIELD OF THE INVENTION

The present invention relates to a tackifier, specifically, a rosin dispersion, and a continuous process for producing the rosin dispersion.

INTRODUCTION

Tackifiers are chemical compounds used in formulating adhesives to increase tack, i.e., stickiness of the adhesives. Rosins, or rosin resins, are one of the widely used tackifiers in pressure sensitive adhesives, and pressure sensitive adhesives are usually made from acrylic polymer emulsions. Rosins are made into rosin dispersions through a batch process with specially selected dispersants before applications.

It is desired in the adhesive area to provide a rosin dispersion with improved loop tack and shear resistance performance. It is also desired to provide a continuous process for preparing rosin dispersions.

SUMMARY OF THE INVENTION

The present invention provides a rosin dispersion that is a reaction product of, by dry weight based on total dry weight of the rosin dispersion, from 80% to 98% a rosin resin, and from 2% to 20% a dispersant. The rosin resin is processed by at least one method of a) modification, b) hydrogenation or disproportionation, and c) polymerization or esterification from raw material rosins. The dispersant is selected from $C_{18}$-$C_{32}$ aliphatic carboxylic acids, olefin (meth)acrylic acid copolymers, and other acid/anhydride modified polymers.

The present invention further provides a continuous process for preparing rosin dispersions comprising the steps of merging into a mechanical disperser a stream of a molten disperse phase with a stream of a molten continuous phase. The molten disperse phase comprises the rosin resin, and the molten continuous phase comprises water. The dispersant is added to the disperse phase, the continuous phase, or both.

The present invention further provides an adhesive formulation comprising an acrylic polymer emulsion and, by dry weight based on total dry weight of the acrylic polymer emulsion, from 1% to 50% a rosin dispersion.

DETAILED DESCRIPTION OF THE INVENTION

The rosin dispersion of the present invention is the reaction product of, by dry weight based on total dry weight of the rosin dispersion, a) from 80% to 98%, preferably from 85% to 95%, and more preferably from 88% to 93%, a rosin resin, and b) from 2% to 20%, preferably from 5% to 15%, and more preferably from 7% to 12%, a dispersant.

The Rosin Resin

The rosin resins used in the present invention are processed by at least one method of a) modification, b) hydrogenation or disproportionation, and c) polymerization or esterification from raw material rosins such as gum rosin, tall oil rosin and wood rosin. Where the rosin resin is processed by at least two methods of the above, the processing order of methods b) and c) is not specifically limited, only that modification method has to be followed, not necessarily directly, by polymerization method if both of them are used. Suitable examples of the rosin resins include modified rosins, hydrogenated rosins, disproportionated rosins and polymerized rosins obtained respectively by modifying, hydrogenating, disproportionating and polymerizing raw material rosins and additionally, rosin esters obtained by esterifying raw material rosins with alcohols or an epoxy compound. Suitable examples of the modified rosins include unsaturated modified rosins obtained by modifying raw material rosins with unsaturated acid, and phenolic modified rosins obtained by modifying raw material rosins with phenols. Suitable examples of the unsaturated acid include acrylic acid, methacrylic acid, fumaric acid and maleic acid. Suitable examples of the phenols include phenol and alkylphenol. The modification method is not specifically limited and a method of mixing raw material rosins with phenols or unsaturated acid and heating them is usually adopted.

Suitable examples of the alcohols for preparing rosin esters from raw material rosins and alcohols include monovalent alcohols such as methanol, ethanol and propanol; divalent alcohols such as ethylene glycol, diethylene glycol, propylene glycol and neopentyl glycol; trivalent alcohols such as glycerin, trimethylol ethane and trimethylolpropane; tetravalent alcohols such as pentaerythritol and diglycerin; and hexavalent alcohols such as dipentaerythritol. Preferably, the alcohol is glycerin, and more preferably, the alcohol is pentaerythritol. The esterification method of the rosin esters is not specifically limited and a method of mixing raw material rosins with alcohols and heating the mixture in the presence of an optional esterification catalyst is adopted. The rosin esters prepared from disproportionated rosins (namely disproportionated rosin esters) are preferred.

Acid value and softening point of the rosin resin vary depending on its species. The acid value is usually from 1 to 50 KOH mg/g, preferably from 1 to 15 KOH mg/g, and the softening point is from 25° C. to 150° C., preferably from 60° C. to 120° C.

Other tackifier resins may be used to replace the rosin resin of the present invention and achieve similar performances. Suitable examples of other tackifier resins include terpenes and modified terpenes; aliphatic; cycloaliphatic and aromatic resins such as $C_5$ aliphatic resins, $C_9$ aromatic resins, and $C_5$/$C_9$ aliphatic/aromatic resins; hydrogenated hydrocarbon resins; terpene-phenol resins; and any combination thereof.

The Dispersant

The dispersant of the present invention is selected from $C_{18}$-$C_{32}$ aliphatic carboxylic acids, preferably $C_{18}$-$C_{28}$ aliphatic carboxylic acid, and more preferably $C_{20}$-$C_{26}$ aliphatic carboxylic acids; olefin (meth)acrylic acid copolymers, preferably those having from 10 wt % to 30 wt % (meth)acrylic acid, and more preferably those having from 15 wt % to 25 wt % (meth)acrylic acid; and other acid/anhydride modified (co)polymers such as partially hydrolyzed polyvinyl alcohol, styrene maleic anhydride copolymers, maleic anhydride modified polyethylene, polypropylene, or polyolefin copolymers, maleic anhydride modified styrene-diene block copolymers, and any combination thereof. Preferably, the dispersant is selected from olefin (meth)acrylic acid copolymers, and suitable examples of the olefin (meth)acrylic acid copolymers include ethylene methacrylic acid copolymers, ethylene acrylic acid copolymers, propylene methacrylic acid copolymers, propylene acrylic acid copolymers. Preferably, the olefin (meth)acrylic acid copolymers are ethylene (meth)acrylic acid copolymers, and more preferably, are ethylene acrylic acid copolymers.

Optionally, conventional ionic or non-ionic surfactants can be used in combination with the above dispersants. Preferably, the surfactant is an anionic surfactant, and suitable examples of the anionic surfactants are selected from sulfonates, phosphates, carboxylates, and any combination thereof. Preferably, the anionic surfactant is sulfonates such as alkyl monoester sulfosuccinate and phosphates such as polyoxyethylene nonylphenyl ether branched phosphate.

The Continuous Process

The rosin dispersion of the present invention is prepared by merging into a mechanical disperser a stream of a molten disperse phase with a stream of a molten continuous phase. The molten disperse phase stream contains the rosin resin that is preferably a solid at room temperature, but molten at some higher temperature. The molten continuous phase stream contains water. The continuous process is an extrusion (or melt kneading) process, which includes melt extrusion and compound extrusion.

In melt extrusion, the rosin resin, generally in the form of flakes or pellets, is delivered to an extruder to get molten. The molten rosin resin is sent through a heated conduit to become the stream of molten rosin resin. This stream is coupled to the continuous phase stream and ultimately merged into the mechanical disperser. If it is desired to introduce neutralizer, fillers, stabilizers, pigments, or other non-reacting compounds to the disperse phase stream, such additions are advantageously done prior to the extrusion and the components are blended by way of compound extrusion.

The dispersant can be added to a) the disperse phase, b) the continuous phase, or c) both. It is preferable to add the dispersant to the disperse phase upstream of the disperser, preferably through an inlet of the extruder.

Preferably, the rosin dispersion is substantially free of organic solvent, i.e., it contains less than 3%, preferably less than 2%, more preferably less than 1%, more preferably less than 0.5%, more preferably less than 0.2%, and most preferably less than 0.1% by weight based on total weight of the dispersion, organic solvent. Solvents which may be present within the stated limits in the rosin dispersion are hydrocarbyl solvents, preferably are aromatic solvents, and more preferably are toluene.

Applications

The rosin dispersion obtained by the method of the present invention is used as the tackifier dispersion in adhesive formulations such as acryl pressure sensitive adhesives. The acryl pressure sensitive adhesive is obtained by compounding the rosin dispersion in an acrylic polymer emulsion.

The acrylic polymer is not specifically limited and various known homopolymers or copolymers can be used in preparing the acryl pressure sensitive adhesive. Suitable examples of the acrylic polymer include the polymerization product of monomers of (meth)acrylates, such as methyl (meth)acrylate, ethyl (meth)acrylate, butyl (meth)acrylate and 2-ethylhexyl (meth)acrylate, and functional monomers, such as (meth)acrylic acid, glycidyl (meth)acrylate, 2-hydroxyethyl (meth)acrylate and (meth)acrylamide. Other copolymerizable monomers such as vinyl acetate and styrene can also be used in the polymerization.

The glass transition temperature of the acrylic polymer in which the (meth)acrylates are the primary component is not specifically limited, but is usually from −90 to 0° C., and preferably from −80 to −10° C. If the glass transition temperature is higher than 0° C., the tackiness is lowered, while if it is lower than −90° C., the adhesion tends to be lowered. Further, the molecular weight of the acrylic polymer is not specifically limited, but its weight average molecular weight is preferably from 100,000 to 1,000,000, and more preferably from 150,000 to 500,000 for better adhesion.

In the adhesive formulations, the rosin dispersion is preferably from 1% to 50%, more preferably from 10% to 40%, by dry weight based on total dry weight of the acrylic polymer.

EXAMPLES

I. Raw Materials

| Name | Description | Supplier |
|---|---|---|
| S-202 rosin resin (S-202)* | glycerol ester of rosin | Guangdong Hualin Chemical Company |
| PRIMACOR ™ EAA 5980i dispersant (EAA 5980i) | ethylene acrylic acid copolymer | The Dow Chemical Company |
| ROBOND ™ PS-7851 acrylic polymer (PS-7851) | acrylic polymer | The Dow Chemical Company |
| SNOWTACK ™ SE780G rosin dispersion (SE780G) | rosin dispersion | Lawter Company |
| RHODAFAC ™ RE-610 surfactant (RE-610) | ionic surfactant | Rhodia Company |
| dimethylethanolamine (DMEA) | neutralizer | Sinopharm Chemical Reagent Company |
| potassium hydroxide (KOH) | neutralizer | Sinopharm Chemical Reagent Company |
| ammonia | neutralizer | Sinopharm Chemical Reagent Company |
| AEROSOL ™ GPG wetting agent | wetting agent | Cytec Company |
| SURFYNOL ™ 440 wetting agent | wetting agent | Air product Company |
| ACRYSOL ™ RM-8W thickener | thickener | The Dow Chemical Company |
| butyl acetate | solvent | Sinopharm Chemical Reagent Company |

*S-202 rosin resin has an acid value less than 15 KOH mg/g, and a softening point of 90° C.

II. Test Methods

Performance tests were conducted on the adhesive laminates after their conditioning in a controlled environment (22-24° C., 45-55% relative humidity) in a testing laboratory for at least overnight.

1. Loop Tack Test

The prepared adhesive laminates were tested on stainless steel (SS) and high density polyethylene (HDPE) testing panel according to FINAT (Féderation Internationale des fabricants et transformateurs d'Adhésifs et Thermocollants) Test Method No. 9 with failure mode being adhesion failure unless otherwise specified. Adhesive laminates examples with failure mode being paper tear (identified below) have better Loop Tack performances compared with examples with failure mode being adhesion failure. The Loop Tack Test was also conducted after Aging (Aging-Loop Tack). The prepared adhesive laminates were put in oven at 65° C. temperature and 80% humidity for 4 days. The laminates were then put in the controlled environment (22-24° C., 50-60% relative humidity) for at least overnight before testing.

2. Shear Resistance Test

FINAT Test Method No. 8 was referred to for Shear Resistance Test with failure mode being cohesion failure.

III. Examples

1. Preparation of Inventive Rosin Dispersions 1 and 2

Rosin dispersion 1 was prepared according to the following process:

A twin-screw extruder was set with the motor speed being 250 rpm, the discharge pressure being 2.0 bar, the discharge temperature being 86° C., and the emulsify zone temperature being 100° C. S-202 rosin and PRIMACOR EAA 5980i dispersant were selected and their feeding rates were respectively set as 3.27 kg/hrs and 0.36 kg/hrs. The dry weight ratio of S-202 rosin to PRIMACOR EAA 5980i dispersant is 9 to 1. The selected S-202 rosin, PRIMACOR EAA 5980i dispersant, initial water (90° C., 13.9 ml/min) and potassium hydroxide solution (90° C., 50% in water, 0.48 ml/min) were melt-blended through compound extrusion in the twin-screw extruder. The melt-blending material was then diluted with water (90° C., 46.56 ml/min) in the twin-screw extruder to form the rosin dispersion. The obtained rosin dispersion had a volume mean particle size of 752 nm (Malvern Zetasizer Nano ZS, and the same hereinafter), a solid content of 50.24%, a viscosity of 246 cps (Brookfield RVDV Digital Viscometer, 63# spindle, 30 rpm, and the same hereinafter), and a pH of 7.8 (Mettler Toledo SevenEasy™ pH meter, and the same hereinafter).

Rosin Dispersion 2 was prepared according to the preparation of Rosin Dispersion 1 but using dimethylethanolamine (DMEA) (90° C., 50% in water, 2 ml/min) substituting potassium hydroxide solution and the dry weight ratio of S-202 rosin to PRIMACOR EAA 5980i dispersant is 85 to 15. The obtained rosin dispersion had a volume mean particle size of 620 nm, a solid content of 50.79%, a viscosity of 650 cps, and a pH of 7.3.

2. Preparation of Comparative Rosin Dispersion 1

A traditional low molecular weight dispersant, RHODAFAC RE-610 surfactant, was used to make the Comparative Rosin Dispersion 1. 50 g S-202 rosin, 5 g butyl acetate and 5 g RHODAFAC RE-610 surfactant were added to a flask and heated to 95° C. After melting, 50 g boiling water was added to the flask with stirring in 10 min, and the Comparative Rosin Dispersion 1 was prepared. The dispersion was cooled down to room temperature and neutralized to pH of 6.5~7.5 by ammonia. The obtained rosin dispersion had a volume mean particle size of 500 nm, a solid content of 52.31%, a viscosity of 90 cps, and a pH of 7.2.

3. Preparation of the Pressure Sensitive Adhesives (PSA)

Rosin Dispersions 1 and 2, and Comparative Rosin Dispersion 1 were respectively used in preparing Pressure Sensitive Adhesives 1 to 2, and Comparative Pressure Sensitive Adhesive 1. SNOWTACK SE780G rosin dispersion is a commercially available rosin dispersion of Lawter Company, and was used in preparing Comparative Pressure Sensitive Adhesive 2.

ROBOND PS-7851 acrylic polymer, either of the above rosin dispersions, by wet weight based on total wet weight of the ROBOND PS-7851 acrylic polymer and the rosin dispersion, 0.3% AEROSOL GPG wetting agent, and 0.4% SURFYNOL 440 wetting agent were added in a flask under stirring for preparing the Pressure Sensitive Adhesives. The dry weight ratio of the rosin dispersion to the ROBOND PS-7851 acrylic polymer is 0.325. ACRYSOL RM-8W thickener and ammonia were added to the flask to adjust the viscosities of the Pressure Sensitive Adhesives to 400 cps to 800 cps and the final pHs to 7 to 8. The actual viscosities of the Pressure Sensitive Adhesives are respectively 500 cps, 650 cps, 630 cps and 550 cps (Brookfield, LVDV, 63#, 30 rpm) and the final pHs are respectively 7.8, 7.5, 7.2 and 7.9 for PSA 1, PSA 2, Comparative PSA 1, and Comparative PSA 2.

4. Preparation of Adhesive Laminates

Pressure Sensitive Adhesives were coated to paper release liners in an amount of 22 g/m$^2$ on dry weight basis and dried to prepare the adhesive laminates. The adhesive layer was in contact with the rough, non-glossy side of paper to give an adhesive sheet.

IV. Results

TABLE 1

| PSA performances | PSA 1 | PSA 2 | Comparative PSA 1 | Comparative PSA 2 |
| --- | --- | --- | --- | --- |
| Rosin dispersion | 85% S-202:15% EAA 5980i | 90% S-202:10% EAA 5980i | 91% S-202:9% RE-610 | SE780G |
| Shear Resistance (1 inch * 1 inch * 1 kg, stainless steel) | 18.8 | 22.9 | 4.0 | 4.8 |
| Loop Tack-SS (N/inch$^2$) | paper tear* | paper tear* | 19.1 | 21.2 |
| Aging-Loop Tack-SS (N/inch$^2$) | 9.3 | 11.8 | 7.0 | 6.8 |
| Retention-SS (ratio of Aging-Loop Tack-SS to Loop Tack-SS) | — | — | 37% | 32% |
| Loop Tack-HDPE (N/inch$^2$) | 11.3 | 12.9 | 11.6 | 13.1 |
| Aging-Loop Tack-HDPE (N/inch$^2$) | 5.2 | 6.8 | 5.9 | 5.8 |
| Retention-HDPE (ratio of Aging-Loop Tack-HDPE to Loop Tack-HDPE) | 46% | 53% | 51% | 44% |

*Failure mode being paper tear.

For all the above performance tests, that is, Shear Resistance Test and Loop Tack Test (and Aging-Loop Tack Test) including those based on stainless steel (SS) and high density polyethylene (HDPE), the higher the resulted values are, the better performances are. For PSA examples with failure mode being paper tear (PSAs 1 and 2), they have better Loop Tack performances compared with PSA examples with failure mode being adhesion failure (Comparative PSAs 1 and 2). Retention values are ratios of Aging tests to non-Aging tests presenting the retention performance of the PSA examples after aging.

It is clear from above Table 1 that PSAs 1 and 2, using the ethylene acrylic acid copolymer dispersant, that is, the PRIMACOR EAA 5980i dispersant, showed significantly improved (higher value) Shear Resistance and SS Loop Tack (based on stainless steel with and without Aging) performance, and acceptable HDPE Loop Tack (based on high density polyethylene) performance, compared to Comparative PSA 1 and Comparative PSA 2 using ordinary dispersants.

What is claimed is:

1. A rosin dispersion which is a reaction product of, by dry weight based on total dry weight of the rosin dispersion, from 80% to 98% a rosin resin, and from 2% to 20% a dispersant, wherein the rosin resin is processed by at least one method of a) modification, b) hydrogenation or disproportionation, and c) polymerization or esterification from raw material rosins, and the dispersant is selected from $C_{18}$-$C_{32}$ aliphatic carboxylic acids, olefin (meth)acrylic acid copolymers, and other acid/anhydride modified polymers, wherein the rosin resin has an acid value of from 1 to 50 KOH mg/g, and a softening point of from 25 to 150° C.

2. A rosin dispersion which is a reaction product of, by dry weight based on total dry weight of the rosin dispersion, from 80% to 98%, a rosin resin, and from 2% to 20%, a dispersant, wherein the rosin resin is processed by at least one method of a) modification, b) hydrogenation or disproportionation, and c) polymerization or esterification from raw material rosins, and the dispersant is selected from olefin (meth)acrylic acid copolymers, and other acid/anhydride modified polymers.

3. The rosin dispersion according to claim 2 wherein the rosin resin is from 85% to 95% by dry weight based on total dry weight of the rosin dispersion.

4. The rosin dispersion according to claim 2 wherein the rosin resin is from 88% to 93% by dry weight based on total dry weight of the rosin dispersion.

5. The rosin dispersion according to claim 1 wherein the rosin resins are disproportionated rosin esters.

6. The rosin dispersion according to claim 1 wherein the dispersants are olefin (meth)acrylic acid copolymers.

7. The rosin dispersion according to claim 1 wherein the dispersants are ethylene-acrylic acid copolymers.

8. A continuous process for preparing the rosin dispersion according to claim 1 comprising the steps of merging into a mechanical disperser a stream of a molten disperse phase with a stream of a molten continuous phase; wherein the molten disperse phase comprises the rosin resin, and the molten continuous phase comprises water; and the dispersant is added to either the disperse phase, the continuous phase, or both.

9. The continuous process according to claim 8 wherein the continuous process is an extrusion process.

10. An adhesive formulation comprising an acrylic polymer emulsion and by dry weight based on total dry weight of the acrylic polymer emulsion, from 1% to 50%, the rosin dispersion according to claim 1.

11. The adhesive formulation according to claim 10 wherein the acrylic polymer emulsion has a glass transition temperature of from −90 to 0° C., and a weight average molecular weight of from 100,000 to 1,000,000.

* * * * *